US008014359B2

(12) United States Patent
Cave et al.

(10) Patent No.: US 8,014,359 B2
(45) Date of Patent: Sep. 6, 2011

(54) METHOD AND APPARATUS FOR ASSIGNING RADIO RESOURCES AND CONTROLLING TRANSMISSION PARAMETERS ON A RANDOM ACCESS CHANNEL

(75) Inventors: Christopher Cave, Verdun (CA); Paul Marinier, Brossard (CA); Vincent Roy, Montreal (CA); Rocco DiGirolamo, Laval (CA)

(73) Assignee: Interdigital Technology Corporation, Wilmington, DE (US)

( * ) Notice: Subject to any disclaimer, the term of this patent is extended or adjusted under 35 U.S.C. 154(b) by 873 days.

(21) Appl. No.: 11/924,493

(22) Filed: Oct. 25, 2007

(65) Prior Publication Data
US 2008/0101305 A1 May 1, 2008

Related U.S. Application Data

(60) Provisional application No. 60/863,276, filed on Oct. 27, 2006.

(51) Int. Cl.
 *H04W 4/00* (2009.01)
 *H04W 72/04* (2009.01)
 *H04J 3/16* (2006.01)
(52) U.S. Cl. ......... 370/332; 370/341; 370/437; 455/450
(58) Field of Classification Search .......... 370/310–350, 370/431, 436–437, 468, 477; 375/132–147; 455/434, 450–454, 464
See application file for complete search history.

(56) References Cited

U.S. PATENT DOCUMENTS

| 6,778,835 | B2* | 8/2004 | You et al. ................ 455/455 |
| 7,197,314 | B2* | 3/2007 | Soldani et al. ............ 455/450 |
| 7,324,465 | B2* | 1/2008 | Lim et al. ................. 370/278 |
| 7,512,086 | B2* | 3/2009 | Choi et al. ............... 370/328 |
| 7,706,824 | B2* | 4/2010 | Schulist et al. ........... 455/517 |
| 7,729,316 | B2* | 6/2010 | Uhlik ...................... 370/334 |
| 2005/0020260 | A1* | 1/2005 | Jeong et al. ............ 455/434 |
| 2005/0237932 | A1* | 10/2005 | Liu ........................ 370/230 |
| 2006/0045047 | A1* | 3/2006 | Choi et al. ............... 370/329 |
| 2007/0142070 | A1* | 6/2007 | Soldani et al. ........... 455/515 |
| 2008/0279257 | A1* | 11/2008 | Vujcic et al. ............ 375/132 |
| 2009/0086698 | A1* | 4/2009 | Roy et al. ............... 370/338 |
| 2009/0247211 | A1* | 10/2009 | Kuroda .................. 455/522 |
| 2009/0252125 | A1* | 10/2009 | Vujcic .................... 370/336 |

FOREIGN PATENT DOCUMENTS

| DE | 19911712 A1 | 10/2000 |
| WO | 00/055990 | 9/2000 |
| WO | WO 0103366 A1 | 1/2001 |
| WO | 2004/030319 | 4/2004 |
| WO | WO 2004030392 A1 | 4/2004 |

(Continued)

OTHER PUBLICATIONS

3$^{rd}$ Generation Partnership Project; Technical Specification Group Radio Access Network; Physical channels and mapping of transport channels onto physical channels (FDD) (Release 7); 3GPP TS 25.211 V7.0.0 (Mar. 2006).

(Continued)

*Primary Examiner* — Tri H Phan
(74) *Attorney, Agent, or Firm* — Condo Roccia LLP

(57) ABSTRACT

A method and apparatus for assigning radio resources and controlling parameters for transmission over a random access channel in wireless communications by enhancing a random access channel is disclosed.

28 Claims, 5 Drawing Sheets

FOREIGN PATENT DOCUMENTS

| | | |
|---|---|---|
| WO | WO 2004042955 A1 | 5/2004 |
| WO | WO 2004100598 A1 | 11/2004 |
| WO | WO 2005101695 A1 | 10/2005 |

OTHER PUBLICATIONS

3rd Generation Partnership Project; Technical Specification Group Radio Access Network; Physical channels and mapping of transport channels onto physical channels (FDD) (Release 7); 3GPP TS 25.211 V7.3.0 (Sep. 2007).

3rd Generation Partnership Project; Technical Specification Group Radio Access Network; Multiplexing and channel coding (FDD) (Release 7); 3GPP TS 25.212 V7.2.0 (Sep. 2006).

3rd Generation Partnership Project; Technical Specification Group Radio Access Network; Multiplexing and channel coding (FDD) (Release 7); 3GPP TS 25.212 V7.6.0 (Sep. 2007).

3rd Generation Partnership Project; Technical Specification Group Radio Access Network; Physical layer procedures (FDD) (Release 7); 3GPP TS 25.214 V7.2.0 (Sep. 2006).

3rd Generation Partnership Project; Technical Specification Group Radio Access Network; Physical layer procedures (FDD) (Release 7); 3GPP TS 25.214 V7.6.0 (Sep. 2007).

3rd Generation Partnership Project; Technical Specification Group Radio Access Network; Medium Access Control (MAC) protocol specification (Release 7); 3GPP TS 25.321 V7.2.0 (Sep. 2006).

3rd Generation Partnership Project; Technical Specification Group Radio Access Network; Medium Access Control (MAC) protocol specification (Release 7); 3GPP TS 25.321 V7.6.0 (Sep. 2007).

Chong, "WCDMA Physical Layer (Chapter 6)," XP-002342680 available at www.comlab.hut.fi/opetus/238/lecture6_ch6.pdf.

Holma et al. "WCDMA for UMTS—Radio Access for Third Generation Mobile Communications", Third Edition; 2004, §§ 6.2.2.4, 6.4.3, 6.5.5, 6.5.6, and 6.6.4.

Iizuka et al., "Efficient Random Access Channel Transmission Method Utilizing Soft-combining of Retransmitted Message Packets According to QoS," The 8th International Conference on Communication Systems, pp. 441-445 (Nov. 25-28, 2002).

NTT Docomo et al., "Random Access Channel Structure for E-UTRA Uplink," 3GPP TSG RAN WG1 Meeting #45, R1-061184 (May 8-12, 2006).

Sarikaya, "Packet Mode in Wireless Networks: Overview of Transition to Third Generation," IEEE Communications Magazine, vol. 38, No. 9, pp. 164-172 (Sep. 1, 2000).

3rd Generation Partnership Project; Technical Specification Group Radio Access Network; Physical channels and mapping of transport channels onto physical channels (FDD) (Release 7); 3GPP TS 25.211 V7.0.0 (Mar. 2006).

3rd Generation Partnership Project; Technical Specification Group Radio Access Network; Physical channels and mapping of transport channels onto physical channels (FDD) (Release 7); 3GPP TS 25.211 V7.3.0 (Sep. 2007).

3rd Generation Partnership Project; Technical Specification Group Radio Access Network; Multiplexing and channel coding (FDD) (Release 7); 3GPP TS 25.212 V7.2.0 (Sep. 2006).

3rd Generation Partnership Project; Technical Specification Group Radio Access Network; Multiplexing and channel coding (FDD) (Release 7); 3GPP TS 25.212 V7.6.0 (Sep. 2007).

3rd Generation Partnership Project; Technical Specification Group Radio Access Network; Physical layer procedures (FDD) (Release 7); 3GPP TS 25.214 V7.2.0 (Sep. 2006).

3rd Generation Partnership Project; Technical Specification Group Radio Access Network; Physical layer procedures (FDD) (Release 7); 3GPP TS 25.214 V7.6.0 (Sep. 2007).

3rd Generation Partnership Project; Technical Specification Group Radio Access Network; Medium Access Control (MAC) protocol specification (Release 7); 3GPP TS 25.321 V7.2.0 (Sep. 2006).

3rd Generation Partnership Project; Technical Specification Group Radio Access Network; Medium Access Control (MAC) protocol specification (Release 7); 3GPP TS 25.321 V7.6.0 (Sep. 2007).

Holma et al. "WCDMA for UMTS—Radio Access for Third Generation Mobile Communications", Third Edition; 2004, §§ 6.2.24, 6.4.3, 6.5.5, 6.5.6, and 6.6.4.

European Telecommunications Standards Institute (ETSI), TS 125 214, V6.10.0, "Universal Mobile Telecommunications System (UMTS); Physical Layer Procedures (FDD) (G3PP TS 25.214 Version 6.10.0 Release 6), Sep. 2006, 62 pages.

3rd Generation Partnership Project; Universal Mobile Telecommunications System (UMTS); Physical layer procedures (FDD) (Release 6); ETSI TS 125 214 V6.10.0 (Sep. 2006).

* cited by examiner

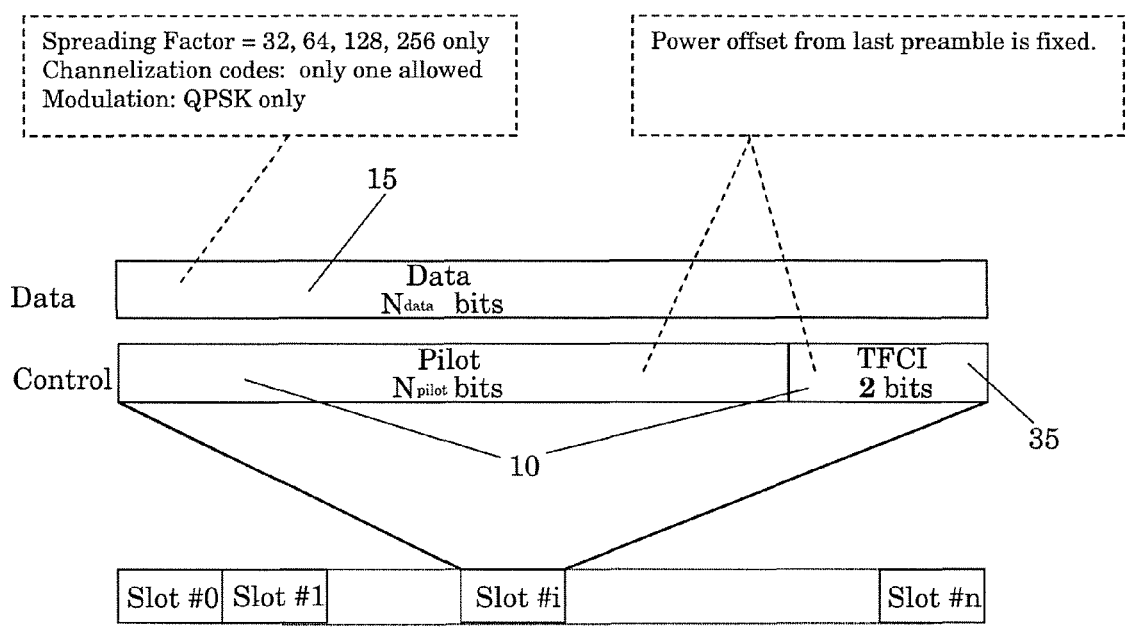
Fig. 1A          Prior Art

METHOD AND APPARATUS FOR ASSIGNING RADIO RESOURCES AND CONTROLLING TRANSMISSION PARAMETERS ON A RANDOM ACCESS CHANNEL

CROSS REFERENCE TO RELATED APPLICATION

This application claims the benefit of U.S. Provisional Application No. 60/863,276 filed on Oct. 27, 2006, which is incorporated herein by reference as if fully set forth.

FIELD OF INVENTION

The present invention is related to wireless communications.

BACKGROUND

In 3GPP UMTS (Third Generation Partnership Project Universal Mobile Telecommunication System) wireless systems, the Random Access Channel (RACH) is an uplink (UL) transport channel that is used for transfer of data and/or control information in the absence of a dedicated radio link. The RACH is mapped to the physical random access channel (PRACH).

Access to the RACH by a wireless transmit-receive unit (WTRU) is based on a slotted-Aloha approach, with acquisition indication received from a radio access network (RAN). The WTRU must first acquire the channel by transmitting a preamble, which comprises a signature sequence that is randomly selected among a set of predetermined sequences. The transmit power of the initial preamble is determined by open loop power control, with parameters determined and broadcast by the RAN.

The WTRU then waits for an acquisition indication from a Node B, which is signaled in the Downlink (DL) on the Acquisition Indicator Channel (AICH). When the Node B detects the PRACH preamble associated with RACH attempt, it echoes on the AICH an identical signature sequence to indicate to the WTRU to transmit over PRACH.

In the case where no AICH is detected, the WTRU increases its transmission power by a predetermined amount and retransmits the preamble in the next available transmission slot. The process is repeated until the AICH is detected by the WTRU, or until a maximum number of preamble transmissions is reached. If a negative acknowledgement is received or the maximum number of transmissions is reached, RACH access has failed and a backoff procedure is performed at the medium access (MAC) layer.

In the case where a positive AICH is transmitted by the Node B, the WTRU transmits the PRACH frame, which consists of a control part 10 and data part 15 as shown in FIG. 1A.

The preamble and AICH procedure provide a way to for the WTRU to reserve the RACH as well as determine the right power for transmission. The power of the control part 10 is set with a fixed offset from the power of the last transmitted preamble. The transmission power of the data part 15 is set using a gain factor with respect to the control part, which is determined in the same way as other UL dedicated physical channels. The gain factor depends on the spreading factor that is used for the data part. Spreading factors 256, 128, 64 and 32 are allowed for the PRACH data part.

Referring to FIG. 2, the AICH consists of a sequence of consecutive access slots 20. Each access slot consists of two parts, an Acquisition-Indicator (AI) part 25 and a part 30 of duration 1024 chips with no transmission. The part of the slot with no transmission 30 is reserved for possible future use. The spreading factor (SF) used for channelization of the AICH is 256.

The transmission rate for RACH/PRACH is limited (single code with spreading factor 32) in existing 3GPP systems. One reason for the limitation is to avoid excessive UL interference caused by WTRUs when transmitting high rate bursts over RACH/PRACH. When a WTRU gains RACH access, it must independently select the transport format for transmission. There is no way for the RAN to dynamically control the transmission rate of WTRUs over RACH/PRACH.

SUMMARY

Disclosed is a method and apparatus for assigning radio resources and controlling parameters for transmission over a contention-based channel that is used by a WRTU to transfer data and/or control information in an uplink to a radio access network (RAN). In one embodiment, a method and apparatus are disclosed for increasing the rate of data transmission over the channel while limiting any resulting increase of noise.

BRIEF DESCRIPTION OF THE DRAWINGS

FIG. 1A shows an existing frame format for a physical random access channel (PRACH).

DETAILED DESCRIPTION

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

Although described within the scope of 3GPP UMTS and UMTS Terrestrial Radio Access (UTRA) wireless communication systems, the following embodiments and teachings are applicable to other wireless communications technologies, including those systems employing random access channels for uplink transmission.

Figure 1B:
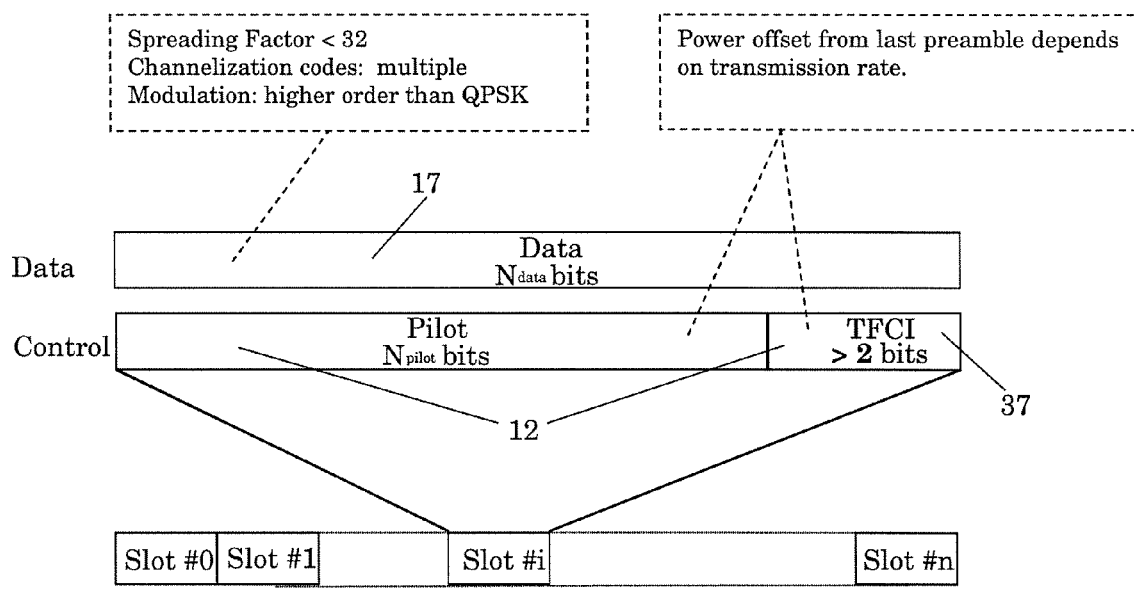
FIG. 1B shows a frame format for a physical random access channel (PRACH) according to the present disclosure.
Figure 2:
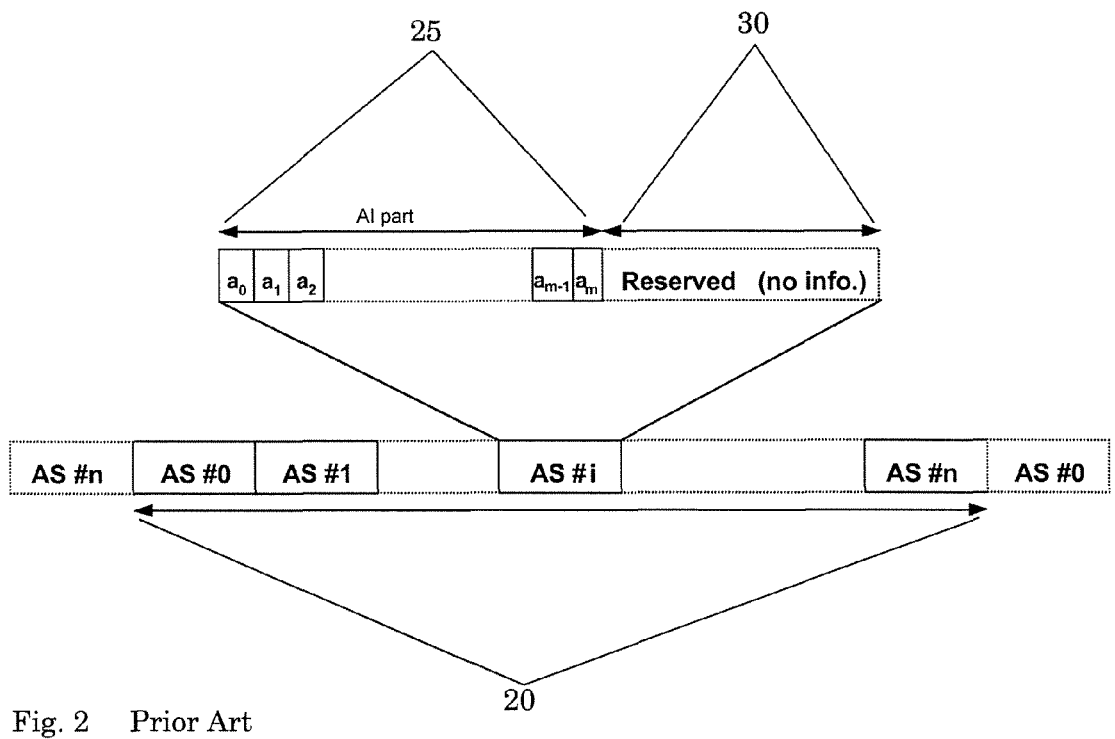
FIG. 2 shows a frame structure for an existing acquisition indicator channel (AICH).

FIG. 1B shows a proposed frame format for a physical random access channel (PRACH). FIG. 1B indicates several methods, not to be considered exhaustive, which may be used individually or in any combination to increase the transmission rate of PRACH frames. A first method includes decreasing a spreading factor (SF) used on the data part 17. A second method includes increasing the number of channelization codes used for the data part 17. A third method includes increasing the order of modulations (e.g. using 8-PSK, 16-QAM, 64-QAM) and variable coding rates (i.e. MSC) for the data part 17. Optionally, the control part of the PRACH frame 12 may be modified to support the higher data rates. An increase in the transmission power of the control part is proposed to improve the reliability of the pilot field when high data rates are used. Specifically, the power offset between the last preamble and the PRACH control part (Pp−m= $P_{message-control} - P_{preamble}$) may be transmission rate dependant, rather than having a single value.

Such an increase in achievable rates of RACH/PRACH may result in a significant increase in the number of transport formats (i.e. slot formats) that need to be supported on the Data portion of the PRACH. The slot format for the Control part 10 of the existing PRACH only provides two bits in the transport format combination index (TFCI) field 35. This currently limits to four the number of transport formats that can be supported on the Data portion of the PRACH. To circumvent this limitation, a new slot format is proposed for the control part 12 of the PRACH, shown in FIG. 1B. This new slot format may provide more than two bits in the TFCI field 37. For example, having 8 bits in the TFCI field 35 would allow for up to $2^8=256$ different slot formats on the Data portion 17 of the PRACH.

certain number of scrambling codes for PRACH transmission using a given PRACH format (e.g. traditional PRACH) while reserving another set of scrambling codes for PRACH transmission using another PRACH format (e.g. Enhanced PRACH). The assignment of scrambling codes may be signaled by higher layers and by RRC broadcast signaling.

A third example is segregation of signature sequences used in the PRACH preamble. The RAN could reserve a certain number of signature sequences for PRACH transmission using a given PRACH format (e.g. traditional PRACH) while reserving another set of signature sequences for PRACH transmission using another PRACH format (e.g. Enhanced PRACH). An example of how signature sequences can be segregated is shown in the Table 1, where P0 to P8 are reserved for PRACH and P9 to P15 are reserved for Enhanced PRACH. Note that this is just one realization of segregation by signature sequence; others are possible.

TABLE 1

| PRACH Type | Preamble signature | Value of n | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| PRACH | $P_0(n)$ | 1 | 1 | 1 | 1 | 1 | 1 | 1 | 1 | 1 | 1 | 1 | 1 | 1 | 1 | 1 | 1 |
| | $P_1(n)$ | 1 | −1 | 1 | −1 | 1 | −1 | 1 | −1 | 1 | −1 | 1 | −1 | 1 | −1 | 1 | −1 |
| | $P_2(n)$ | 1 | 1 | −1 | −1 | 1 | 1 | −1 | −1 | 1 | 1 | −1 | −1 | 1 | 1 | −1 | −1 |
| | $P_3(n)$ | 1 | −1 | −1 | 1 | 1 | −1 | −1 | 1 | 1 | −1 | −1 | 1 | 1 | −1 | −1 | 1 |
| | $P_4(n)$ | 1 | 1 | 1 | 1 | −1 | −1 | −1 | −1 | 1 | 1 | 1 | 1 | −1 | −1 | −1 | −1 |
| | $P_5(n)$ | 1 | −1 | 1 | −1 | −1 | 1 | −1 | 1 | 1 | −1 | 1 | −1 | −1 | 1 | −1 | 1 |
| | $P_6(n)$ | 1 | 1 | −1 | −1 | −1 | −1 | 1 | 1 | 1 | 1 | −1 | −1 | −1 | −1 | 1 | 1 |
| | $P_7(n)$ | 1 | −1 | −1 | 1 | −1 | 1 | 1 | −1 | 1 | −1 | −1 | 1 | −1 | 1 | 1 | −1 |
| | $P_8(n)$ | 1 | 1 | 1 | 1 | 1 | 1 | 1 | 1 | −1 | −1 | −1 | −1 | −1 | −1 | −1 | −1 |
| Enhanced PRACH | $P_9(n)$ | 1 | −1 | 1 | −1 | 1 | −1 | 1 | −1 | −1 | 1 | −1 | 1 | −1 | 1 | −1 | 1 |
| | $P_{10}(n)$ | 1 | 1 | −1 | −1 | 1 | 1 | −1 | −1 | −1 | −1 | 1 | 1 | −1 | −1 | 1 | 1 |
| | $P_{11}(n)$ | 1 | −1 | −1 | 1 | 1 | −1 | −1 | 1 | −1 | 1 | 1 | −1 | −1 | 1 | 1 | −1 |
| | $P_{12}(n)$ | 1 | 1 | 1 | 1 | −1 | −1 | −1 | −1 | −1 | −1 | −1 | −1 | 1 | 1 | 1 | 1 |
| | $P_{13}(n)$ | 1 | −1 | 1 | −1 | −1 | 1 | −1 | 1 | −1 | 1 | −1 | 1 | 1 | −1 | 1 | −1 |
| | $P_{14}(n)$ | 1 | 1 | −1 | −1 | −1 | −1 | 1 | 1 | −1 | −1 | 1 | 1 | 1 | 1 | −1 | −1 |
| | $P_{15}(n)$ | 1 | −1 | −1 | 1 | −1 | 1 | 1 | −1 | −1 | 1 | 1 | −1 | 1 | −1 | −1 | 1 |

For backward compatibility this newly defined slot format, containing more than two bits in the TFCI field 37, will need to coexist with the former slot format which only provided for two bits in the TFCI field 35. Having two different PRACH types coexist, the PRACH and an Enhanced-PRACH, brings a challenge for a base station to properly decode a PRACH since the base station currently has no means by which it can learn which PRACH type a particular WTRU uses for the control part 10 and data part 15 of its PRACH transmission.

This backward compatibility issue can be addressed by performing a segregation of the radio resources used by the PRACH in two groups. One group is reserved for the PRACH transmissions using the old PRACH format and another group is reserved for the Enhanced PRACH transmissions using the new PRACH format. This segregation can be ensured by the RAN through dedicated radio resource channel (RRC) signaling or broadcast RRC signaling. Three examples, not to be considered exhaustive or limiting, follow.

Figure 5:
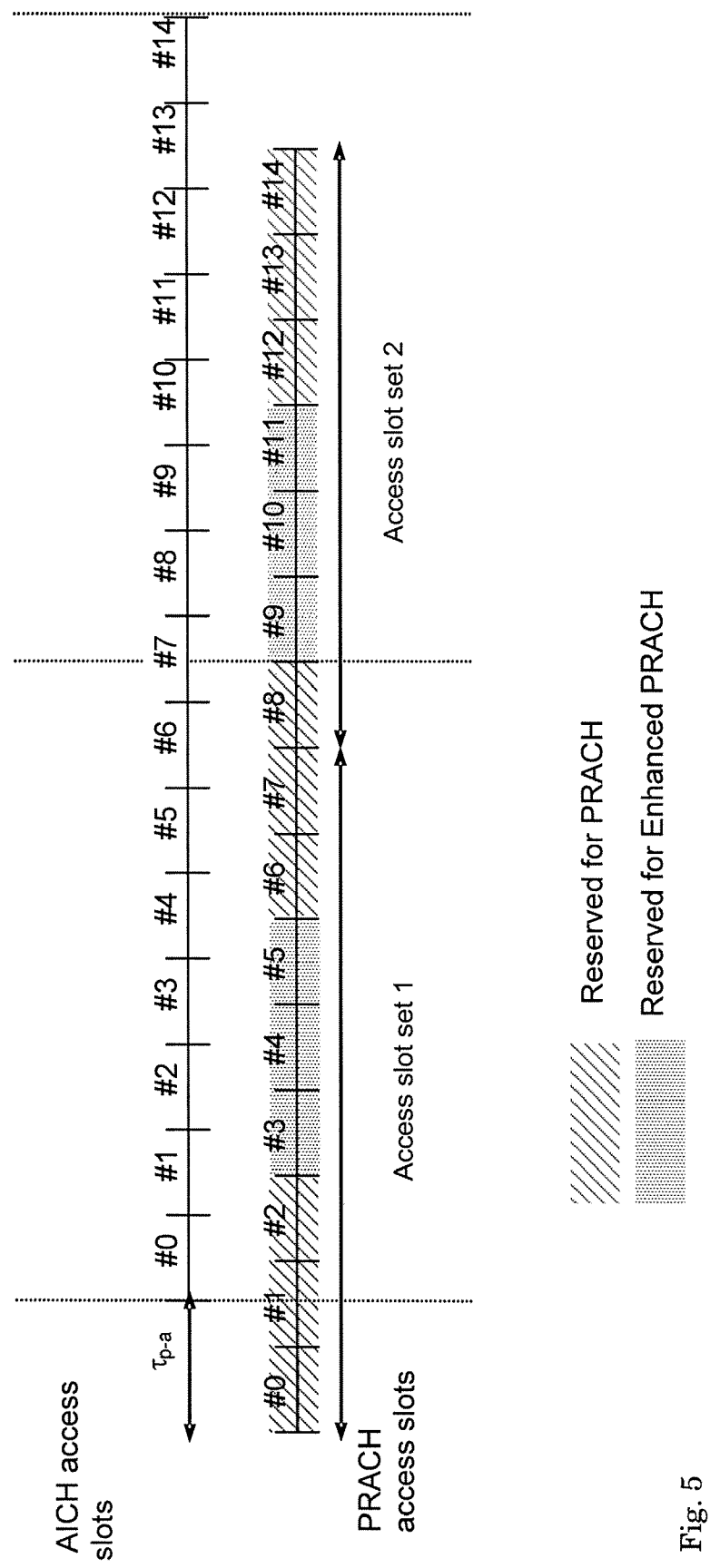
FIG. 5 shows a method for distinguishing among different PRACH types according to the present disclosure.

A first example, illustrated in FIG. 5, is segregation in the time slots available for PRACH transmissions. The RAN could reserve a certain number of slots for PRACH transmission using a given PRACH format while reserving another set of slots for PRACH transmission using another PRACH slot format. FIG. 5 illustrates one particular example of segmentation by access slot; other examples are possible.

A second example is segregation of the scrambling codes used for PRACH transmissions. The RAN could reserve a Increasing the data rate according to the disclosed method may increase the amount of noise generated. In order to avoid excessive noise rise caused by high data rate RACH/PRACH bursts, the RAN may be configured to control the interference generated by the WTRUs. Specifically, the RAN may indicate to the WTRU, prior to WTRU transmission of the PRACH frame, the maximum transmission rate and/or power that can be used for transmitting the PRACH frame. Alternatively, a grant may be pre-configured (e.g. through RRC broadcast signaling) to allow the WTRU to start transmission and, optionally, the grant may be readjusted by the UTRA Network (UTRAN) while the WTRU is transmitting over the Enhanced RACH.

The information signaled from the RAN to the WTRU may effectively limit the system impact caused by the PRACH frame, while allowing the WTRU to select the highest transport block size and maximize the efficiency of the RACH access. A grant-type signaling mechanism is disclosed, where the RAN indicates to the WTRU the maximum amount of UL resources that can be consumed for transmission of the PRACH frame. The following non-exhaustive list of example metrics and parameters is proposed, the metrics to be used individually or in any combination to determine what UL resources should be granted for enhanced PRACH transmission.

A first example is maximum power ratio, which indicates the maximum power ratio between the enhanced PRACH data part 17 and the control part 12, or the maximum power ratio between the enhanced PRACH data part 17 and the preamble power. The maximum power ratio is one possible measure of the transmission power of the WTRU. Controlling the power of the WTRU is one way of controlling noise rise or interference caused by the WTRU in the UL. This power control may be performed by the base station.

A second example of a metric for determining what UL resources should be granted for enhanced PRACH transmission is maximum transmission power, which indicates the maximum total power that the WTRU can use for transmission of the PRACH frame with enhanced data part 17 and control part 12. The maximum total power can be determined as an absolute value (e.g. 20 dBm), or as a relative power with respect to the preamble power. As with the previous example, controlling the power of the WTRU effectively controls the noise rise or interference that is caused by the WTRU in the UL. This power control may be performed by the base station.

A third example of a metric is maximum RACH transport block size. Determination of this quantity allows the UTRAN to control interference that is generated by the WTRU by controlling the amount of time that the RACH is used.

A fourth example of a metric is transmission time interval (TTI) size.

A fifth example of a metric is a maximum amount of time (e.g. number of TTI) the WTRU can transmit.

The value of the grant may be mapped to an index, where the mapping is known by the WTRU and RAN. The mapping may be broadcast by the RAN over BCCH/BCH, configured through higher layer signaling or pre-configured in WTRU devices.

Various mechanisms are proposed in the following, to allow the RAN to convey the information described above. These mechanisms can be used individually or in any combination.

Figure 3:
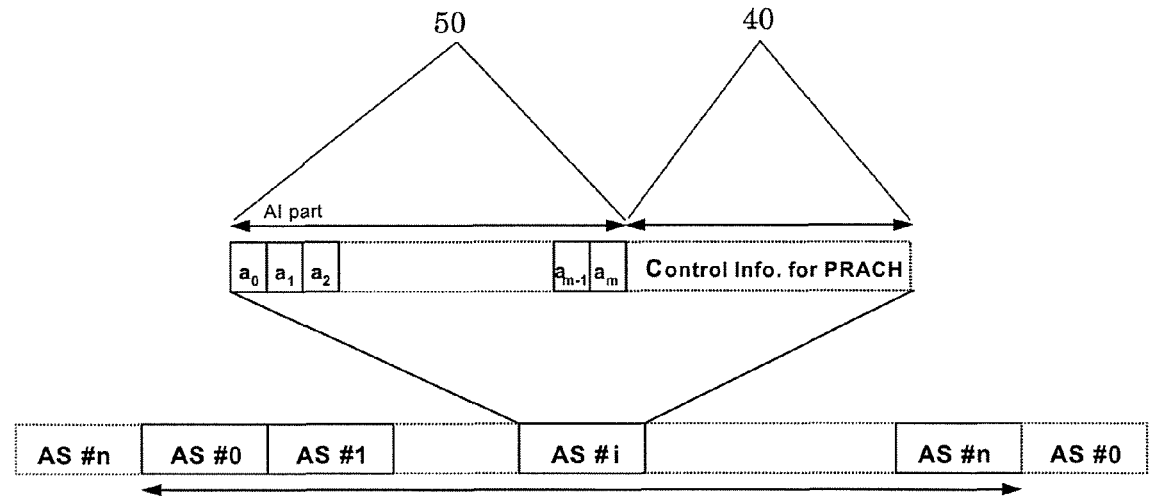
FIG. 3 shows a structure for an AICH according to the present disclosure.

In one embodiment, shown in FIG. 3, the control information is conveyed to the WTRU using an existing AICH or similar channel. Specifically, the RAN takes advantage of an acquisition indication that is sent between the preamble and the PRACH frame to indicate to the WTRU the maximum transmission rate. A proposed structure of an AICH is shown in FIG. 3. The first part 50 of the AICH access slot may have the same meaning as in the existing AICH, whereas the last part 40 which was previously the reserved part 30 contains the control information.

In one example embodiment, the number of chips in the above examples may be retained: the first part, or AI part, 50 of the AICH may contain 4096 chips and the second part 40 may contain 1024 chips. Using a SF256 channelization code, a sequence of 8 real-valued signals can be transmitted over the 1024 chips. A predefined sequence of symbols, e.g. signature sequence, can be defined for each of the control information levels. The mapping between symbol sequence and control information index should be known at the RAN and the WTRU; this mapping may be broadcast by the RAN, configured through higher layer signaling or pre-configured.

Alternatively, the last 1024 chips 40 of the AICH slot can be interpreted as a new bit field (e.g. 4 bits) which contains the index of the control information, where channel coding may be used to increase decoding reliability of the bit field.

Alternatively, the control grant may be conveying using any of: existing enhanced access gate channel (E-AGCH) and enhanced reverse gate channel (E-RGCH) to indicate "grant" for PRACH frames; the forward access channel (FACH) transport channel or similar channel; and the broadcast control channel (BCCH) logical channel, which is mapped to the broadcast channel (BCH) transport channel. In this case, the control information is broadcast throughout the cell and may be either common to all WTRUs using the PRACH, or signaled individually to WTRUs using RACH/PRACH. In addition one may use other new or existing physical layer signaling and/or L2 control channel to convey the control grant.

The RAN may make a decision as to the WTRU maximum transmission rate and/or power for each WTRU that has successfully acquired the RACH through the preamble mechanism. This decision may be made autonomously or be directed by the WTRU.

The RAN could make this decision independently for each WTRU that has successfully acquired the channel. An example of a metric for this is a limit on the UL interference. Although effective when a single WTRU has acquired the RACH channel, it may lead to inefficiencies when more than one WTRU transmits on the RACH. In the latter case, a WTRU may be assigned a higher rate/power but may not need it. The extra assignment to this WTRU would be lost, as no other WTRU could use it.

In this approach, the RAN tries to assign the capacity among the WTRUs based on limiting UL interference, while at the same time maximizing the probability that this extra capacity will be used. In order to achieve this, the RAN may require an indication as to the WTRU buffer occupancy. A higher occupancy would imply a higher probability of using the extra capacity. The WTRU need only provide a coarse indication of buffer occupancy (e.g. low, medium, high, very high). This information could be signaled during the RACH preamble in several alternative ways. As one example, a trailer may be appended to the preamble message with the buffer occupancy indication. Alternatively, the information may be coded in the preamble signature sequences; that is, reserving a set of signature sequences for each of the buffer occupancy levels.

Figure 4:
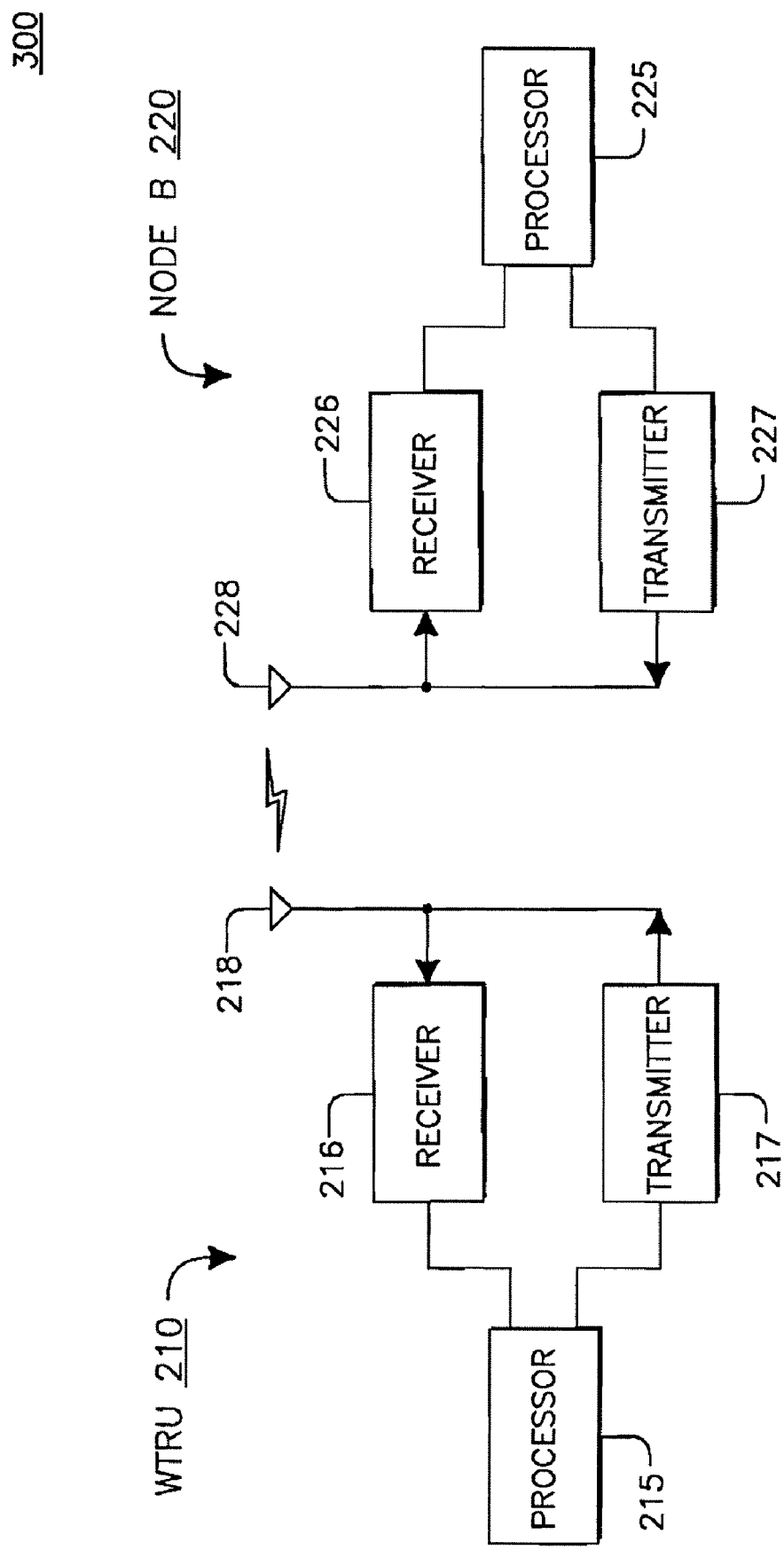
FIG. 4 is a functional block diagram of a portion of a representative wireless communication system with a WTRU and a Node-B.

FIG. 4 is a functional block diagram 300 of a portion of a representative wireless communication system with a WTRU 210 and a Node-B, or base station 220. The WTRU 210 and base station 220 are in two-way communication with each other, and are both configured to perform a method such as one of the embodiments described above for increasing a data transmission rate over a random access channel.

In addition to the components that may be found in a typical WTRU, the WTRU 210 includes a processor 215, a receiver 216, a transmitter 217, and an antenna 218. The processor 215 is configured to perform a method such as one of the embodiments described above for increasing a data transmission rate over a random access channel. The receiver 216 and the transmitter 217 are in communication with the processor 215. The antenna 218 is in communication with both the receiver 216 and the transmitter 217 to facilitate the transmission and reception of wireless data.

In addition to the components that may be found in a typical Node-B, the Node-B 220 includes a processor 225, a receiver 226, a transmitter 227, and an antenna 228. The processor 225 is configured to perform a method such as one of the embodiments described above for increasing a data transmission rate over a random access channel. The receiver 226 and the transmitter 227 are in communication with the processor 225. The antenna 228 is in communication with both the receiver 226 and the transmitter 227 to facilitate the transmission and reception of wireless data.

By way of example, embodiments may be implemented in a base station, wireless network controller, at the data link layer or the network layer, in the form of software or hardware in a WCDMA FDD or long term evolution (LTE).

Although features and elements are described above in particular combinations, each feature or element can be used alone without the other features and elements or in various combinations with or without other features and elements. The methods or flow charts provided herein may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for transmitting data using enhanced random access channel (RACH) procedure, the method comprising:
   receiving an indication associated with uplink transmission via broadcast signaling, the indication comprising a maximum amount of transmission time and a maximum ratio of data part power to control part power; and
   transmitting, via a processor, data in the uplink in accordance with the received maximum ratio of data part power to control part power and the received maximum amount of transmission time.

2. The method of claim 1, wherein data is transmitted on enhanced RACH.

3. The method of claim 2, wherein data is transmitted on enhanced physical random access channel (PRACH).

4. The method of claim 1, wherein transmitting data in the uplink further comprises transmitting a plurality of PRACH slots, each PRACH slot comprising a data part and a control part.

5. The method of claim 4, further comprising transmitting data using more than one spreading factor for channelization codes used in the data part.

6. The method of claim 4, further comprising varying a number of channelization codes used in the data part.

7. The method of claim 4, further comprising varying an order of modulation in the data part.

8. The method of claim 4, further comprising varying transmission power in at least one of the data part and the control part.

9. The method of claim 1, wherein the maximum amount of transmission time comprises a maximum number of transmission time intervals.

10. The method of claim 1, wherein the indication associated with uplink transmission further comprises at least one of:
    a maximum transmission rate that can be used for transmitting a PRACH frame; and
    a maximum power that can be used for transmitting the PRACH frame;
    a maximum ratio of a PRACH data part power to a power of a preamble;
    an absolute maximum total power for transmission of the PRACH frame;
    a maximum power for transmission of the PRACH frame relative to the power of a preamble;
    a maximum random access channel (RACH) transport block size; and
    a transmission time interval (TTI) size.

11. The method of claim 1, further comprising:
    receiving a second indication comprising a second maximum ratio of data part power to control part power; and
    transmitting data in the uplink in accordance with the second maximum ratio of data part power to control part power.

12. The method of claim 11, wherein the second indication is received via at least one of an enhanced absolute grant channel (E-AGCH) and enhanced relative grant channel (E-RGCH).

13. A wireless transmit-receive unit (WTRU) comprising:
    a receiver;
    a transmitter; and
    a processor in communication with the receiver and the transmitter, the processor being configured to:
        receive an indication associated with uplink transmission via broadcast signaling, the indication comprising a maximum amount of transmission time and a maximum ratio of data part power to control part power, and
        transmit data in the uplink in accordance with the received maximum ratio of data part power to control part power and the received maximum amount of transmission time.

14. The WTRU of claim 13, wherein data is transmitted on enhanced RACH.

15. The WTRU of claim 13, wherein data is transmitted on enhanced PRACH.

16. The WTRU of claim 13, wherein the processor is further configured to transmit a plurality of PRACH slots, each PRACH slot comprising a data part and a control part.

17. The WTRU of claim 16, wherein the processor is further configured to transmit data using more than one spreading factor for channelization codes used in the data part.

18. The WTRU of claim 16 wherein the processor is further configured to vary a number of channelization codes used in the data part.

19. The WTRU of claim 16, wherein the processor is further configured to vary modulation in the data part.

20. The WTRU of claim 16, wherein the processor is further configured to vary transmission power in at least one of the data part and the control part.

21. The WTRU of claim 13, wherein the indication associated with uplink transmission further comprises at least one of:
    a maximum transmission rate that can be used for transmitting a PRACH frame; and
    a maximum power that can be used for transmitting the PRACH frame;
    a maximum ratio of a PRACH data part power to a power of a preamble;

an absolute maximum total power for transmission of the PRACH frame;

a maximum power for transmission of the PRACH frame relative to the power of a preamble;

a maximum random access channel (RACH) transport block size; and a transmission time interval (TTI) size.

22. The WTRU of claim 13, wherein the processor is further configured to:

receive a second indication comprising a second maximum ratio of data part power to control part power; and transmit data in the uplink in accordance with the second maximum ratio of data part power to control part power.

23. The WTRU of claim 22, wherein the second indication is received via at least one of an enhanced absolute grant channel (E-AGCH) and enhanced relative grant channel (E-RGCH).

24. A method for establishing access to an uplink channel, the method comprising:

receiving a first set of scrambling codes reserved for PRACH transmission;

receiving a second set of scrambling codes reserved for enhanced PRACH transmission;

selecting a scrambling code from the second set of scrambling codes if enhanced uplink transmission is supported;

transmitting a PRACH preamble comprising the selected scrambling code;

receiving a first set of signature sequences reserved for transmission in a first PRACH format;

receiving a second set of signature sequences reserved for transmission in a second PRACH format; and randomly selecting a signature sequence from the received second set of signature sequences if enhanced uplink transmission is supported, wherein the PRACH preamble further comprises the randomly selected signature sequence.

25. The method of claim 24, wherein the second PRACH format is associated with enhanced PRACH.

26. A wireless transmit-receive unit (WTRU) comprising:

a receiver;

a transmitter; and a processor in communication with the receiver and the transmitter, the processor being configured to:

receive a first set of scrambling codes reserved for PRACH transmission, receive a second set of scrambling codes reserved for enhanced PRACH transmission, select a scrambling code from the second set of scrambling codes if enhanced uplink transmission is supported, transmit a PRACH preamble comprising the selected scrambling code;

receive a first set of signature sequences reserved for transmission in a first PRACH format;

receive a second set of signature sequences reserved for transmission in a second PRACH format; and randomly select a signature sequence from the received second set of signature sequences if enhanced uplink transmission is supported, wherein the PRACH reamble further comprises the randomly selected signature sequence.

27. The WTRU of claim 26, wherein the second PRACH format is associated with enhanced uplink transmission.

28. A method for assigning radio resources and controlling transmission parameters over a random access channel in wireless communications, comprising the steps of:

broadcasting an indication associated with enhanced RACH procedures, the indication comprising a maximum ratio of data part power to control part power, a maximum amount of transmission time, a first set of scrambling codes reserved for PRACH transmission, a second set of scrambling codes reserved for enhanced PRACH transmission, first set of signature sequences reserved for PRACH transmission, a second set of signature sequences reserved for enhanced PRACH transmission;

receiving a PRACH preamble comprising a signature sequence of the broadcasted second set of signature sequences reserved for enhanced PRACH transmission and a scrambling code of the broadcasted second set of scrambling codes reserved for enhanced PRACH transmission; and transmitting, via a processor, an acquisition indicator channel (AICH) frame in response to the received PRACH preamble.

* * * * *